(12) United States Patent
Etchegoyen

(10) Patent No.: US 11,455,390 B2
(45) Date of Patent: *Sep. 27, 2022

(54) PSYCHOGRAPHIC DEVICE FINGERPRINTING

(71) Applicant: Craig S. Etchegoyen, Newport Beach, CA (US)

(72) Inventor: Craig S. Etchegoyen, Newport Beach, CA (US)

(73) Assignee: UNILOC 2017 LLC, Wilmington, DE (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/001,637

(22) Filed: Aug. 24, 2020

(65) Prior Publication Data

US 2020/0394296 A1 Dec. 17, 2020

Related U.S. Application Data

(63) Continuation of application No. 13/235,281, filed on Sep. 16, 2011, now Pat. No. 10,754,945.

(Continued)

(51) Int. Cl.
*G06F 21/55* (2013.01)
*G06F 21/31* (2013.01)
(Continued)

(52) U.S. Cl.
CPC ............ *G06F 21/552* (2013.01); *G06F 16/29* (2019.01); *G06F 21/316* (2013.01);
(Continued)

(58) Field of Classification Search
CPC ...... G06F 21/552; G06F 16/29; G06F 21/316; H04L 67/22; H04L 67/306; H04N 21/4532; H04H 60/37; H04H 60/40; H04H 60/51
(Continued)

(56) References Cited

U.S. PATENT DOCUMENTS 4,118,789 A 10/1978 Casto et al.
4,319,085 A 3/1982 Welch et al.
(Continued)

FOREIGN PATENT DOCUMENTS

EP 2073497 A1 * 6/2009 ............ H04L 67/24

*Primary Examiner* — Schquita D Goodwin
(74) *Attorney, Agent, or Firm* — Burdick Patents, P.A.; Sean Burdick

(57) ABSTRACT

A system for generating a psychographic device fingerprint includes a server in communication with a network and memory storing a program which, when executed by the server, performs steps for (a) detecting reception at a computing device of media content delivered via the network, (b) reading device elements stored on the computing device, (c) reading a geographic indicator from the computing device, (d) reading a content indicator identifying the media content, (e) determining a timing parameter associated with reception of the content at the computing device, and (f) deriving from the device type, the geographic indicator, the content indicator, and the timing parameter, the psychographic device fingerprint as computer readable code uniquely identifying a user of the computing device. The steps may further include recording media content received by multiple computing devices, and generating a viewership report relating computing devices and psychographic device fingerprints to the media content received.

19 Claims, 13 Drawing Sheets

Related U.S. Application Data

(60) Provisional application No. 61/383,676, filed on Sep. 16, 2010.

(51) Int. Cl.
  *G06F 16/29* (2019.01)
  *H04L 67/306* (2022.01)
  *H04N 21/45* (2011.01)
  *H04L 67/50* (2022.01)
  *H04H 60/40* (2008.01)
  *H04H 60/37* (2008.01)
  *H04H 60/51* (2008.01)

(52) U.S. Cl.
  CPC .......... *H04L 67/306* (2013.01); *H04L 67/535* (2022.05); *H04N 21/4532* (2013.01); *H04H 60/37* (2013.01); *H04H 60/40* (2013.01); *H04H 60/51* (2013.01)

(58) Field of Classification Search
  USPC .......................................................... 709/219
  See application file for complete search history.

(56) References Cited

U.S. PATENT DOCUMENTS

| | | |
|---|---|---|
| 4,658,093 A | 4/1987 | Hellman |
| 4,885,778 A | 12/1989 | Weiss |
| 5,291,598 A | 3/1994 | Grundy |
| 5,490,216 A | 2/1996 | Richardson, III |
| 6,158,005 A | 12/2000 | Bharathan et al. |
| 6,233,567 B1 | 5/2001 | Cohen |
| 6,243,468 B1 | 6/2001 | Pearce et al. |
| 6,505,160 B1 | 1/2003 | Levy et al. |
| 6,536,005 B1 | 3/2003 | Augarten |
| 6,785,717 B1 | 8/2004 | Nickerson et al. |
| 7,017,044 B1 | 3/2006 | Carpenter et al. |
| 7,111,167 B1 | 9/2006 | Yeung et al. |
| 7,181,195 B2 | 2/2007 | Booth et al. |
| 7,188,241 B2 | 3/2007 | Cronce et al. |
| 7,251,687 B1 | 7/2007 | Mccullough |
| 7,272,728 B2 | 9/2007 | Pierson et al. |
| 7,302,590 B2 | 11/2007 | Dublish et al. |
| 7,319,987 B1 | 1/2008 | Hoffman et al. |
| 7,420,474 B1 | 9/2008 | Elks et al. |
| 7,428,587 B2 | 9/2008 | Rowland et al. |
| 7,463,945 B2 | 12/2008 | Kiesel et al. |
| 7,617,231 B2 | 11/2009 | Moon et al. |
| 7,653,899 B1 | 1/2010 | Lindahi et al. |
| 7,779,274 B2 | 8/2010 | Dublish et al. |
| 7,908,645 B2 | 3/2011 | Varghese et al. |
| 7,934,250 B2 | 4/2011 | Richardson |
| 7,970,946 B1 | 6/2011 | Djabarov et al. |
| 8,108,245 B1 | 1/2012 | Hosea et al. |
| 8,584,114 B2 | 11/2013 | Rabinovich et al. |
| 8,635,087 B1 | 1/2014 | Igoe et al. |
| 10,754,945 B2 * | 8/2020 | Etchegoyen .......... H04L 67/306 |
| 2003/0008668 A1 | 1/2003 | Perez-Breva et al. |
| 2003/0074660 A1 | 4/2003 | Mccormack et al. |
| 2003/0097562 A1 | 5/2003 | Wheeler et al. |
| 2003/0101449 A1 | 5/2003 | Bentolila et al. |
| 2004/0030901 A1 | 2/2004 | Wheeler et al. |
| 2004/0030912 A1 | 2/2004 | Merkle et al. |
| 2004/0062084 A1 | 4/2004 | Layman et al. |
| 2004/0122931 A1 | 6/2004 | Rowland et al. |
| 2004/0133577 A1 | 7/2004 | Miloushev et al. |
| 2004/0143746 A1 | 7/2004 | Ligeti et al. |
| 2004/0187018 A1 | 9/2004 | Owen et al. |
| 2004/0254890 A1 | 12/2004 | Sancho et al. |
| 2005/0033833 A1 | 2/2005 | Baldiga et al. |
| 2005/0050531 A1 | 3/2005 | Lee |
| 2005/0057488 A1 | 3/2005 | White |
| 2005/0138155 A1 | 6/2005 | Lewis |
| 2005/0180403 A1 | 8/2005 | Haddad et al. |
| 2006/0161914 A1 | 7/2006 | Morrison et al. |
| 2006/0181394 A1 | 8/2006 | Clarke |
| 2006/0200672 A1 | 9/2006 | Calhoon et al. |
| 2006/0230317 A1 | 10/2006 | Anderson |
| 2006/0242155 A1 | 10/2006 | Moore et al. |
| 2006/0274753 A1 | 12/2006 | Park et al. |
| 2006/0282660 A1 | 12/2006 | Varghese et al. |
| 2007/0094208 A1 | 4/2007 | Cerrato |
| 2007/0100690 A1 | 5/2007 | Hopkins |
| 2007/0113090 A1 | 5/2007 | Villela |
| 2007/0136726 A1 | 6/2007 | Freeland et al. |
| 2007/0143073 A1 | 6/2007 | Richardson |
| 2007/0162927 A1 | 7/2007 | Ramaswamy et al. |
| 2007/0219917 A1 | 9/2007 | Liu et al. |
| 2007/0234409 A1 | 10/2007 | Eisen |
| 2007/0234427 A1 | 10/2007 | Gardner et al. |
| 2007/0239606 A1 | 10/2007 | Eisen |
| 2007/0294265 A1 | 12/2007 | Askew et al. |
| 2008/0005655 A1 | 1/2008 | Sankaran et al. |
| 2008/0059285 A1 | 3/2008 | Hamoui |
| 2008/0117201 A1 * | 5/2008 | Martinez ................ G06Q 30/02 345/418 |
| 2008/0133556 A1 | 6/2008 | Conwell et al. |
| 2008/0250239 A1 | 10/2008 | Risan et al. |
| 2008/0256448 A1 | 10/2008 | Bhatt |
| 2008/0289029 A1 * | 11/2008 | Kim .................... G06F 16/9577 726/12 |
| 2009/0187939 A1 * | 7/2009 | Lajoie ................ H04N 7/17318 725/34 |
| 2010/0057843 A1 * | 3/2010 | Landsman .......... H04L 63/0876 709/224 |
| 2010/0306831 A1 * | 12/2010 | Mu ........................ G06Q 30/06 726/5 |
| 2011/0041076 A1 * | 2/2011 | Sinn ...................... G06Q 30/02 715/745 |
| 2011/0069940 A1 * | 3/2011 | Shimy ................ H04N 5/44543 386/296 |

* cited by examiner

PSYCHOGRAPHIC DEVICE FINGERPRINTING

This application is a continuation of U.S. patent application Ser. No. 13/235,281, which was filed on Sep. 16, 2011, which claims priority to U.S. Provisional Application No. 61/383,676, which was filed on Sep. 16, 2010, both of which are fully incorporated herein by reference.

BACKGROUND OF THE INVENTION

1. Field of the Invention

The present invention is directed generally to technology for identifying remote computing devices through network communications. More specifically, the invention is directed to identifying an active user of a remote computing device by detecting a combination of device element data and user behavioral data to differentiate among multiple users of a common device.

2. Description of the Related Art

The science of determining consumer values, likes, and dislikes through the prism of human interaction with technology has modern roots in ratings systems developed for measuring the response of mass population to television broadcasting. Advertisers and broadcasters have customarily relied on ratings systems such as the Nielsen system to determine viewership or audience size, i.e. an estimate of the total population of viewers tuned in to a particular TV program, so that the value of advertising slots broadcast during the program can be fairly assessed. The Nielsen system in its earliest application relied on written diaries kept and submitted by a sampling of consumers. Statistics gathered by this system are of questionable reliability, as the accuracy depends on the truth and diligence of consumers lazily engaged in the leisure activity of watching television.

Until recently, video entertainment for the consumer at large has been broadcast almost exclusively for reception on conventional television sets. Advancements in computers and compression technologies have now made it possible for consumers to receive much of the same entertainment as streaming video on a computer monitor or a hand-held computing device such as a smart phone or an Apple iPod. The computing devices enable consumers to interact with the broadcasting experience, by providing the consumer with an abundance of programming selections from an ever increasing number of entertainment-providing sites accessible via the world-wide web. Today, consumers on the go who prefer to stream video entertainment into their mobile devices are even less likely to make meaningful diary entries.

In a later application of the Nielsen system, set meters were developed in an effort to eliminate inaccuracies introduced by human data collection. Set meters are electronic devices that monitor which station the television displays at a given sampling time, and transmit the information to a central database using telephone lines. Set meters, however, introduce other sources of inaccuracy. For example, a set meter can erroneously report viewership habits when a TV is left on when no one is home or when everyone in the house has fallen asleep. Set meter technology has not kept pace with advances in TV technology, which have in recent years introduced new digital broadcasting standards and a proliferation of manufacturers and models that create compatibility problems.

The Nielsen diary and set meter methods for collecting viewership data have been made even more impractical with the advent of streaming video that is deliverable directly to a personal or laptop computer or mobile computing device. Consumers may now watch video programs, or portions of programs, while working on a PC, while traveling, or wherever they may be. The many types of computing devices available to the consumer that are capable of receiving streaming video have rendered set meter technology inadequate for effective viewership capture. There is now more interest than ever in collecting viewership data that not only indicates whether a program is being watched, but also the types of devices that are receiving it. What is needed is a reliable system for collecting viewership data for video entertainment that is delivered to a wide variety of computing devices.

SUMMARY OF THE INVENTION

The invention disclosed herein solves the problem of determining viewership for web-delivered media content over communication networks accessible by a wide variety of computer-based devices. Moreover, the invention provides a means for identifying individual users, or subsets of users, who receive the web-delivered media content on computer-based devices that are shared among many individuals in a larger set or group. In general, the invention achieves these solutions by generating psychographic device fingerprints for computer-based devices. According to the invention, a psychographic device fingerprint may be derived from a combination of device hardware parameters and device behavioral parameters.

In one embodiment, a system for generating a psychographic device fingerprint may be characterized as a special-purpose computing system having a server in data communication with a network, and having memory accessible by the server. The memory stores a psychographic device fingerprint generating program which, when executed by the server, performs a series of steps for generating a psychographic device fingerprint and associating that fingerprint with a particular user of a particular computing device. The steps include: (a) detecting reception at a computing device of media content delivered via the network, (b) reading one or more device elements from memory stored on the computing device, (c) reading a geographic indicator from memory stored on the computing device, (d) reading a content indicator identifying the media content, (e) determining a timing parameter associated with reception of the content at the computing device, and (f) deriving from the device elements, the geographic indicator, the content indicator, and the timing parameter, the psychographic device fingerprint. The psychographic device fingerprint comprises computer readable code that uniquely identifies a user of the computing device, or a subgroup of users associated with the computing device. The method steps may further include a step for (g) the server recording in a database the media content received, the psychographic device fingerprint of the computing device, and receipt of the media content by the computing device.

In another embodiment of the invention, the special-purpose computing system executes the steps (a)-(g) for each of multiple computing devices. The system then performs and additional step for (h) generating a viewership report relating numbers of computing devices to media content received by the computing devices.

Related embodiments of the invention include methods for generating psychographic device fingerprints, and methods for generating viewership reports for web-delivered media content using the psychographic device fingerprints. Process steps of these methods may be expressed as a series of instructions in computer-readable code, such as steps (a)-(h) stored in the memory executable by the system server.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION

The present invention addresses the need for determining viewership of web-delivered media content, and for differentiating viewership at a particular computing device among multiple users of the computing device. The invention differentiates viewership by combining device fingerprinting methods based on device configuration data with device fingerprinting methods based on device usage data. The combination of configuration data and usage data attributable to a single device composes a psychographic device fingerprint that uniquely identifies a computing device and the active user or users of the computing device.

Figure 1:
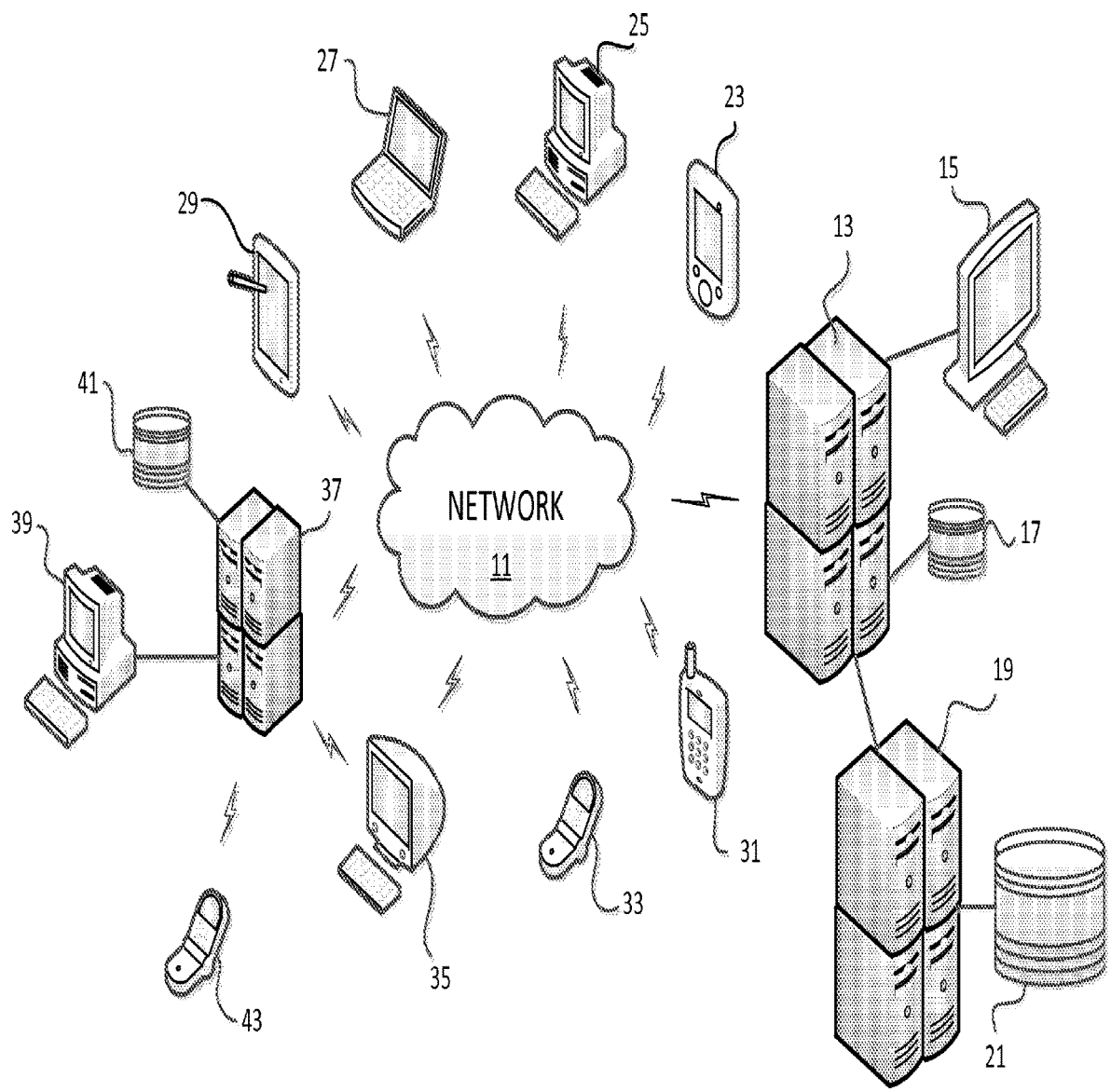
FIG. 1 is a pictorial block diagram of a modern communications network in which the present invention may be implemented.

Within the scope of the invention, computing devices that may be uniquely identified with a psychographic device fingerprint include any device capable of receiving media content remotely through a network connection. FIG. 1 illustrates many such devices connected in a modern network communications system 10. System 10 represents but one example of a network within which the present invention may be practiced.

System 10 at its center depicts a network cloud 11, which represents a combination of wired and wireless communication links between devices that make up the rest of the system. The communication links of network 11 may run from any device to any other device in the network, and may include any means or medium by which analog or digital signals may be transmitted and received, such as radio waves at a selected carrier frequency modulated by a signal having information content. Network 11 may include telecommunication means such as cellular communication schemes, telephone lines, and broadband cable. The communication means of network 11 may also include any conventional digital communications protocol, or any conventional analog communications method, for transmitting information content between computing devices. In one embodiment, or for ease of illustration, network 11 may be considered to be synonymous with the Internet.

Psychographic device fingerprinting of any device connected to network 11 may be performed by running a psychographic device fingerprint generating (PDFG) program on the device. The PDFG may be stored on any device or number of devices; however, for purposes of illustration, throughout the remainder of this disclosure embodiments of the invention are described in which the PDFG program is stored primarily on an application server. When authorized or requested by a user of any other device connected to network 11, the PDFG program may be transferred from application server to the requesting device for execution thereon and for temporary or secondary storage therein.

Application server 13 may be a special-purpose computer system that includes a set of hardware and software components dedicated to the execution of the PDFG program. Application server 13 may be configured for network communications, i.e., for transmitting and receiving requests to and from other devices linked to network 11, and may include a web server to facilitate network communications. Application server 13 may also be configured to perform other functions conventionally associated with application servers, such as security, redundancy, fail-over, and load-balancing. A user interface 15 provides user or administrator access to data processed by the application server, or to the software components that make up the application server.

Memory 17 stores operating system, web server, PDFG, and other data or executable software stored on application server 13.

A database server 19 may be linked for data communication with application server 13. Database server 19 may be a special purpose computer system that includes hardware and software components dedicated to providing database services to application server 13. Database server 19 interfaces with memory 21, which may be a large-capacity storage system. In one implementation of psychographic device fingerprinting according to the invention, memory 21 may be a main repository or historical archive for storing a comprehensive collection of psychographic device fingerprints for millions of devices communicating, or having once communicated, through network 11.

Any computing device capable of receiving media content via network 11 may be subject to psychographic device fingerprinting according to the invention. System 10 provides a representative group of such devices for purposes of illustrating exemplary embodiments of the invention, but the invention is by no means limited to the number and type of devices shown in FIG. 1. Examples of devices known today for which a unique psychographic device fingerprint may be defined by the invention include, but are not limited to, a PDA 23, a PC 25, a laptop 27, an iPad 29, a smart phone 31, a cell phone 33, and an Apple computer 35, as shown, all or any of which may be configured for direct or indirect communication via network 11. Any device in the preceding list of devices may be referred to hereinafter as a "computing device", a "client device", a "requesting device", or a "receiving device".

A server 37 may also constitute a computing device subject to psychographic device fingerprinting. Moreover, each device among a group of devices configured to communicate locally with server 37, and to access network 11 via server 37, may potentially be psychographically fingerprinted according to the invention. These include, for example, the Apple computer 35, a PC 39, and a cell phone 43, as shown. Server 37 may be any type of server, such as an application server, a web server, or a database server, and may access a memory 41. In one embodiment, server 37 provides a web page accessible through network 11 by other devices. The web page may provide media content such as audio, video, and graphics stored in memory 41 for downloading or streaming via network 11.

Figure 2:
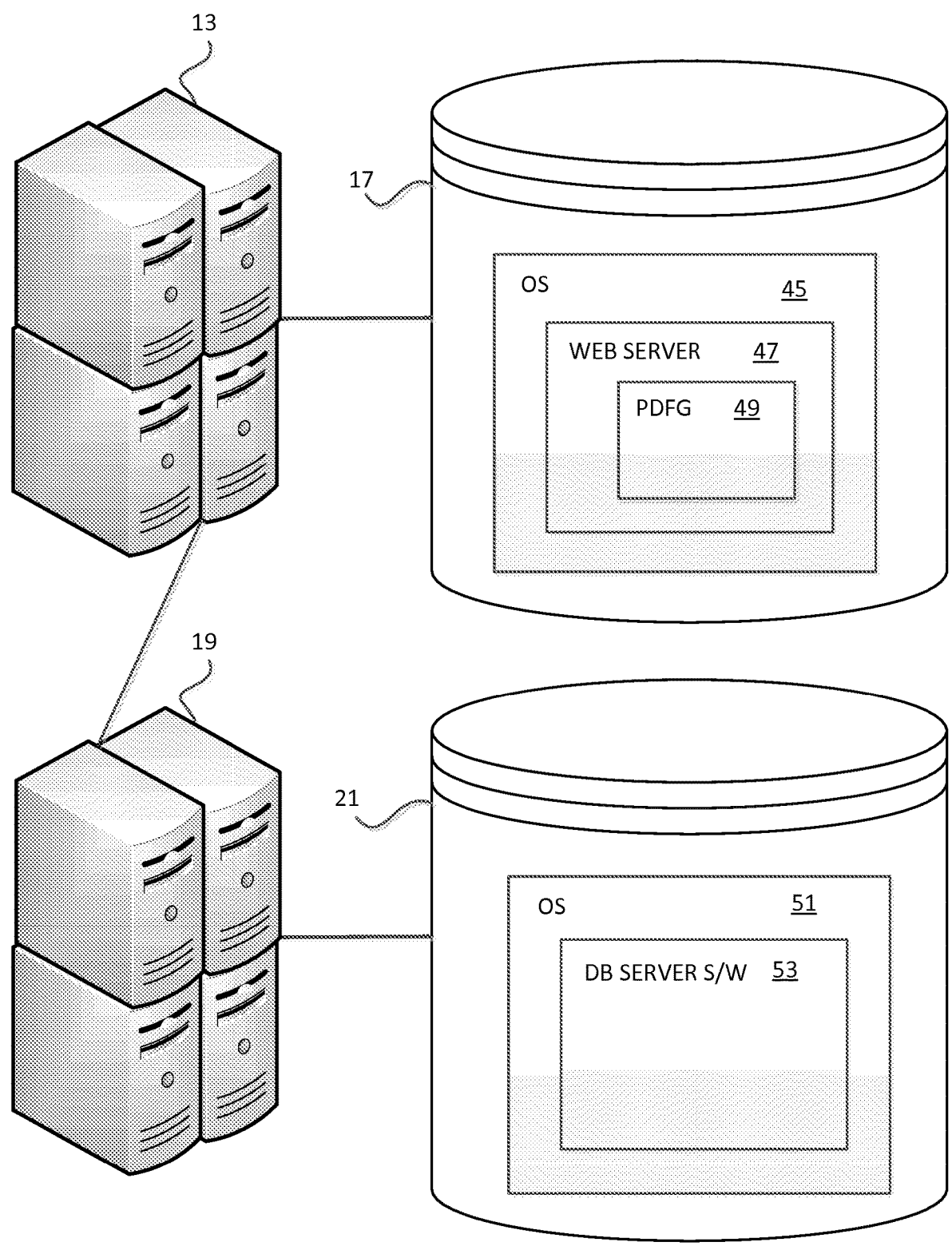
FIG. 2 is a block diagram of one embodiment of a system according to the invention for psychographic device fingerprinting.

FIG. 2 illustrates a block diagram of a system according to one embodiment of the invention for implementing psychographic device fingerprinting. As indicated in the figure, the platform of application server 13 may include a set of software programs stored in the memory. These programs include an operating system (OS) 45, which manages basic hardware functions of server 13, such as input and output and memory allocation. OS 45 may further provide services for execution of application software, such as the web server 47 and the PDFG 49. OS 45 may be any operating system, such as a Windows, Unix, Mac OS, Linux, or Google Chrome operating system.

Web server 47 may comprise software necessary for serving content using an appropriate protocol, such as hypertext transfer protocol (HTTP), over network 11. The content served may include a web page to facilitate communication with other devices via the network. In any event, web server 47 is configured to respond to resource requests received from client devices, and to issue resource requests to client devices. For example, web server 47 may include routines for requesting resources from other devices connected to network 11, where those resources contain information used to derive a psychographic device fingerprint according to the invention. Web server programs having user agent applications implementing network protocols for connecting to uniform resource locator (URL) paths are well known in the computing arts, and any such program, supplemented as necessary for implementation of PDFG 49 of the present invention, may be appropriate for the coding of web server 47.

Software program PDFG 49 includes all code, data, text files, and executable algorithms for deriving a psychographic device fingerprint from a computing device. PDFG 49 may be organized as a source tree, and may be composed in any source code language compatible with modern computing systems, such as Java or C, and may implement encoding rules such as XML. PDFG 49 may further include data, executable files, plug-ins, or other content that may comprise resources or requests served by web server 47 via network 11 under control of OS 45. A psychographic device fingerprinting algorithm stored in PDFG 49 may derive a psychographic device fingerprint for any remote computing device communicating via network 11, such as any one of devices 23, 25, 27, 29, 31, 33, 35, 37, 39, and 43. Examples of PDFG algorithms dedicated to deriving psychographic device fingerprints from data associated with a particular remote computing device are modeled and described herein as process flow diagrams 400, 500, 600 and 700.

The platform of database server 19 may be stored in memory 21. Memory 21 may store an operating system (OS) program 51, as well as database (DB) server software 53. The OS 51 may be any operating system satisfactory for this purpose, such as any of those listed above for application server 13. DB server software 53 contains the programs necessary for providing database services to application server 13. The memory 21 may also provide large-scale data storage for a master archive of psychographic device fingerprints as previously described. Memory 21 may also provide backup storage, such as in a master-slave architecture for database servers. The application server 13 and database server 19, interacting with remote devices via network 11 within a system such as system 10, provides an exemplary computing environment for psychographic device fingerprinting according to the invention.

The concept of psychographic device fingerprinting, pioneered by the present inventor, addresses the need for differentiating among multiple users of a common computing device. The need may arise, for example, in the context of targeted advertising or targeted delivery of media content. For example, a typical group of users who share a common computing device may be a family of six that shares an Apple TV. Individual users in the family group may include a father, a mother, a teenage son, a teenage daughter, a younger son, and a younger daughter. Subgroups within the family group may include (i) the parents, (ii) all four children, (iii) the two teenagers, (iv) the two younger kids, (v) the three males, and (vi) the three females. A subgroup comprising all family members may also be defined. Skilled artisans will appreciate that many other types of user groups that share computing devices may be subdivided into other subgroups, and that the invention may be applied to such other types, devices, and subgroups, so that no further elaboration on this subject is necessary. The skilled artisan may also appreciate that applications for psychographic device fingerprinting may arise in fields other than advertising, such as security, performance diagnostics and testing, social networking, and criminal investigation, to name a few.

The term "psychographics" is defined by Merriam-Webster.com as (i) market research or statistics classifying population groups according to psychological variables, such as attitudes, values, or fears, and (ii) variables or trends identified through such research. The Free Online Dictionary defines "psychographics" as (i) the use of demographics to study and measure attitudes, values, lifestyles, and opinions, as for marketing purposes, and (ii) the data obtained from such study. Thus, prior to the present invention, psychographics was a term used to describe the tendencies of people.

The present invention derives psychographics that are modified through human interfacing with computers. The invention characterizes the human-computer interface by identifying a combination of human behavioral traits, as translated into computing device operations, with operating parameters and physical configuration data of the computing device itself. The second part of this combination, i.e. the operating parameters and configuration data, has been used in the past, for example, by the assignee of the present invention, for purposes of uniquely identifying a device using a concept known as device fingerprinting. By combining the translated human behavioral traits with device operating parameters and configuration data, the present invention derives code for uniquely identifying both the device and the user, coined herein as a psychographic device fingerprint.

To identify individual users or subgroups of users actively engaged in receiving media content, a PDFG algorithm according to the invention extracts information related to user habits or behavior, as reflected in the behavior or operation of a device being queried. There are many ways that a user's behavioral traits may be translated into computing device operations when the user is operating the device to receive media content. The time of day that the device requests the content, the content being requested, the type of device requesting the content, the frequency of requests, the duration of the request, and the location of the device at the time of request, are all examples (though not an exhaustive list) of user behavior translated into device operations. The psychographic device fingerprinting algorithms of the invention are designed to extract data from network-connected computing devices indicative of one or more of such behavioral traits as input to the algorithm. To illustrate further, the invention provides a means for identifying who is receiving media content, what content is being received, where the content is being received, when the content is being received, and how the content is being received (e.g., by what type of device)—who, what, where, when, and how.

Figure 3:
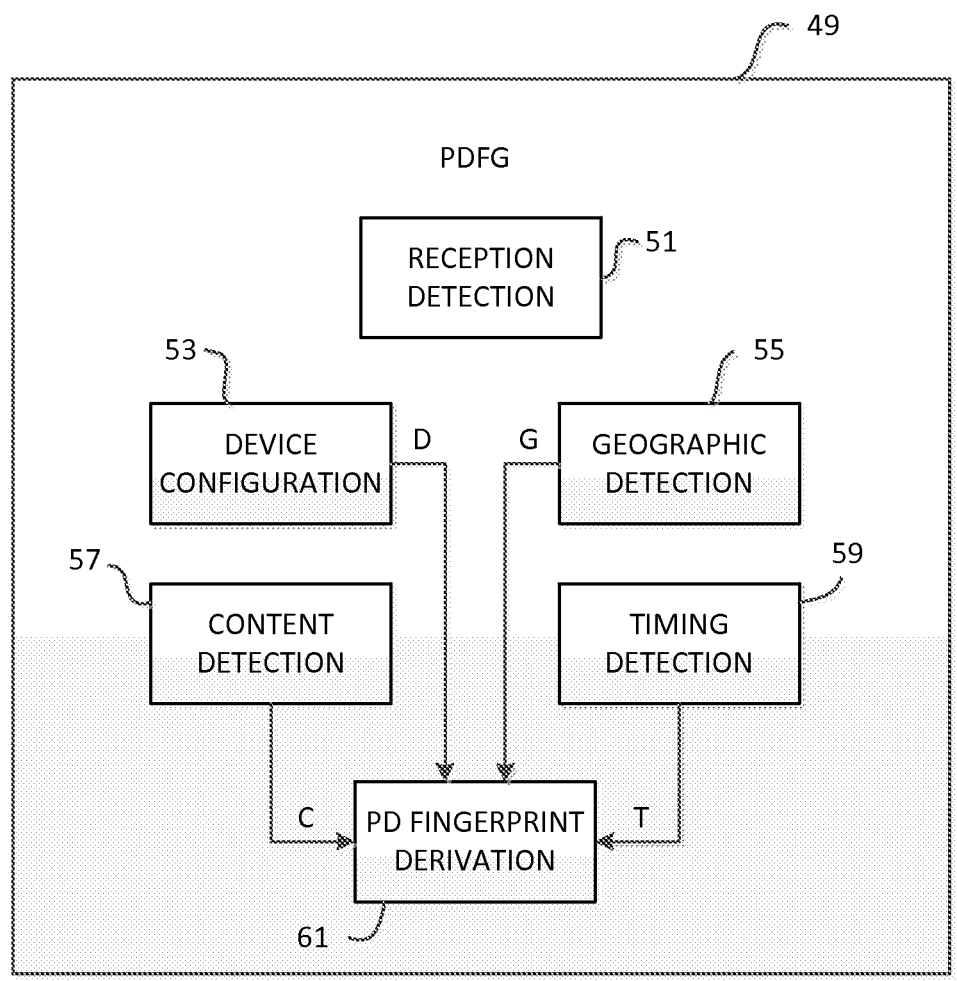
FIG. 3 is a block diagram of software program components according to one embodiment of the invention for psychographic device fingerprinting.

FIG. 3 shows a block diagram of software program components of a PDFG program 49 according to one embodiment of the invention. PDFG program 49 may be stored in an application server, as in the system of FIG. 2. Or, it may reside elsewhere in system 10, for example, as a browser plug-in installed on a client device responsive to a download operation from application server 13 to the client device. In another embodiment, a PDFG program 49 may be installed as an executable program on a hard drive of a network-connected computing device, either from stand-alone software transferred from a CD-ROM or other medium, or as part of a bundled package of software, for example, as software pre-loaded with the operating system of a computing device purchased directly from the device manufacturer or its authorized distributor.

Within PDFG program 49, a first component 51 is coded to detect reception of media content by a computing device. Where PDFG program 49 executes from the application server, the reception detection component 51 detects reception of media content by a remote computing device. For example, component 51 may be configured to receive transmissions via the network from media content providers indicating that a resource request has been received by a server of the content from a particular IP address of a client device. Other methods of detecting reception are possible within the scope of the invention. For example, where PDFG program 49 executes locally from a computing device, it may operate within a browser and detect an incoming audio or video or graphics stream of requested media content.

In response to detecting reception of media content, PDFG program 51 may further execute one or more program components to extract psychographic data from the requesting device. In one embodiment, the psychographic data may be extracted by executing a device type identification component 53, a geographic detection component 55, a content detection component 57, and a timing detection component 59. These components may extract some or all of the psychographic data from computer readable information stored in the browser of the computing device. In other embodiments, the components may extract some or all of the psychographic data from information stored in other accessible memory locations, such as flash files in a flash directory, or web cookies stored in a directory specified for that purpose.

The device identification component 53 reads one or more device elements stored in memory on the receiving device. The device elements may include configuration data D extractable from the device, or from a web browser or other software executable on the device, which, in combination, allow derivation of a unique character string suitable for uniquely fingerprinting the device. Such data may be user-configurable or non-user configurable, and may include the MAC address, IP address, an installed hardware or peripheral make, model, version, or serial number, a GUID, or one or more character strings that indicate the presence of customized features in software installed on the device, such as in a web browser. The customized features may include, for example, selected fonts, time zone attributes, languages, etc. Customized features may also be evident in character strings that indicate the presence of aftermarket software or plug-ins such as Acrobat, ActiveX, Silverlight, etc. The science of device fingerprinting, per se, is disclosed in further detail in other applications of the present assignee, and so will not be further presented here.

The device elements read by the device identification component may further include data that indicates, either directly or indirectly, the type of computing device receiving media content. Some examples of device elements that may provide an indication of device type include data indicative of CPU type, data indicative of plug-ins customized for particular devices, data indicative of display dimensions (width and height), and data indicative of device manufacturer or model. Some examples of general device types include desktop computers, mobile phones, laptop computers, and web-enabled television sets. Some examples of more specific device types include HP desktop computers, Motorola Droids, RIM Blackberries, Nintendo Wii gaming systems, and Apple TVs. In one embodiment, the device type may be determined from the device elements separately from the device fingerprint. In another embodiment, the device type may be determined and encoded as part of the device fingerprint, so that the device type may be easily identified from the device fingerprint.

The geographic detection component 55 reads data from the receiving device indicative of geographic location G of the receiving device. There are many possible sources of data readable from a computing device that may define its geographic location. For example, an IP address read from memory stored on the receiving device may be associated with a geographic region, such as a county or city. Or, geographic detection component 55 may read information defining the location of computing device according to GPS coordinates. Or, geographic detection component 55 may read information stored in a browser of the computing device, or stored in cookies, or in time zone selections, that provides evidence of a geographic location. For example, frequent occurrences in requests for directions from a home location to a destination may be extracted from a series of URL headers provided by a mapping server such as Google Maps or MapQuest.

The content detection component 57 reads data that indicates, generally or specifically, the subject of the media content being received. The content indicating data C may be read from the receiving device, or from the encoded media content that is being requested by the receiving device. In an embodiment where the PDFG program 49 runs from the application server 13, the requested content may be reported to the content detection component of the application server by a media content provider, in which case the subject of the media content may be exactly known. In other embodiments, where the PDFG program 49 runs locally from a client computing device, the content detection component 57 may read data contained in a header of the media content being received to extract content data such as a movie title. In another embodiment, content detection component 57 may sample the bit stream of media content being provided, and by comparing the sampled data to a database of known content signatures, determine generally the subject of the content being received.

The timing detection component 59 reads data that indicates a timing parameter T associated with the reception of media content at the computing device. The timing parameter may represent a time of day that media content is requested by or delivered to the requesting device, to any desired accuracy (e.g., hour, minute, second). Or, the timing parameter may represent a duration for which the media content was displayed on the requesting device. For example, a receiver of a two-hour movie may voluntarily stop viewing the movie by closing the application playing the movie. In such a case, the timing detection component 59 reads a timing parameter indicating a total display time for that particular viewing. Other timing parameters are possible within the scope of the invention, such as timing parameters indicating time-stamped segments of media viewed or displayed, i.e., starting points and stopping points. The timing parameters may be extracted, for example, from clocks running on the receiving device, on the content provider's server, on the application server, or from application software used to display the requested media content.

PDFG program 49, after generating the data D, G, C and T, processes the data through a psychographic device fingerprint derivation component 61. Bit streams represented by D, G, C and T may be processed by a combination of one or more summing, hashing, randomization, and encoding algorithms to output a bit stream that comprises the psychographic device fingerprint. In one embodiment, the D data may be processed according to a separate device fingerprinting algorithm, and the output of that algorithm may be further modified by the G, C and T data to finally derive the psychographic device fingerprint. In another embodiment, the separate device fingerprinting program may be integral to component 61. In another embodiment, the device fingerprint may have already been generated for the device, in which case the D data may include indicia representing the fingerprint of the device. In another embodiment, the indicia may be used to retrieve the device fingerprint from the database server 19, for use with G, C and T parameters in deriving a psychographic device fingerprint.

According to the invention, a psychographic device fingerprint for a computing device may comprise multiple signatures that are associated with a device fingerprint of the same computing device. For example, the teenagers using the device 29 at the home of a neighbor between the hours of 3 PM and 5 PM to view a Spiderman movie will cause PDGF program 49 to generate a signature for a psychographic device fingerprint that would differ from a second signature caused by their father using the same device at home between the hours of 10 PM and 11 PM to stream in highlights from the day's professional sporting events. PDFG 49 may then store the first and second signatures in a single psychographic device fingerprint in a database in a manner that relates each signature to computing device 35. The composition of a psychographic device fingerprint having multiple signatures will be addressed in further detail below.

In one embodiment of the invention, a locally executing PDFG program 49 may transmit a data packet to application server 13 containing information representing the configuration data D, the geographic location G, the content C, and the timing parameter T, for derivation of a psychographic device fingerprint by the PDFG program executing on the application server. The data packet may be modified by compression, encoding, encryption, or other means, or by some combination of these, prior to transmission via network 11. In another embodiment, the PDFG program 49 running locally on a client device may derive the psychographic device fingerprint through execution of PD fingerprint derivation component 61 prior to transmission of the psychographic device fingerprint to the application server 13.

Figure 4:
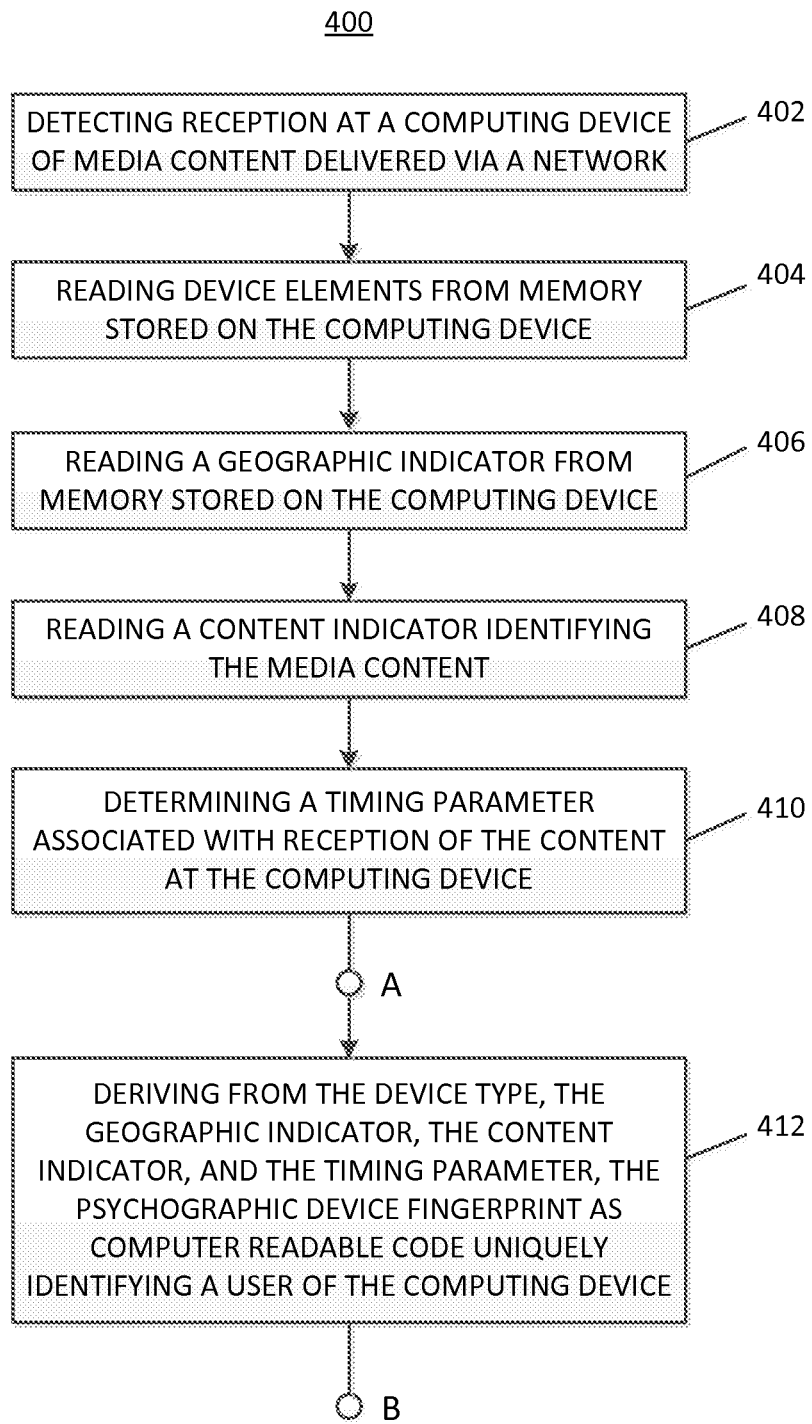
FIG. 4 is a process flow chart illustrating one embodiment of a method according to the invention for psychographic device fingerprinting.

FIG. 4 shows a process flow chart of one embodiment of a method 400 according to the invention for psychographic device fingerprinting. The flow chart (and others that follow) presents salient steps in such a process. It should be understood that the steps presented may be supplemented with additional steps or with further detail without departing from the scope of the invention. The invention illustrated in method 400, and in variations that follow, may be best understood by interpreting the steps within the context of a PDFG program 49 running within a system 10 as described above.

Method 400 begins at step 402, which provides for detection of reception of media content by a computing device, for content delivered via a computing network. In one example, the media content may be streaming video, such as a motion picture delivered in shockwave-flash format (.swf), and the computing device may be a laptop computer receiving the content through a web browser responsive to a resource request transmitted via the world wide web. After detecting reception of the media content, step 404 may execute. In step 404, the PDFG program reads device elements from memory stored on the computing device receiving the media content. Step 404 may be carried out before, during or after content delivery. Following or concurrently with step 404, the process performs steps 406, 408, and 410.

In step 406, the PDFG program reads a geographic indicator from memory stored on the computing device. In step 408, the program reads a content indicator that identifies the media content, either in specific terms, e.g., by title or author name or artist name, or in more general terms, e.g., as a movie, a video game, a music video, or in both specific and general terms. In step 410, the PDFG program determines a timing parameter associated with reception of the content at the computing device. The timing parameter may indicate when the computing device received the media content, when the media content was viewed on the computing device, how long the media content was displayed for viewing, etc. Finally, in step 412, the PDFG program derives from the device type, the geographic indicator, the content indicator, and the timing parameter, the psychographic device fingerprint. The psychographic device fingerprint comprises computer readable code that uniquely identifies a user, or a group or subgroup of users, of the computing device.

Figure 5:
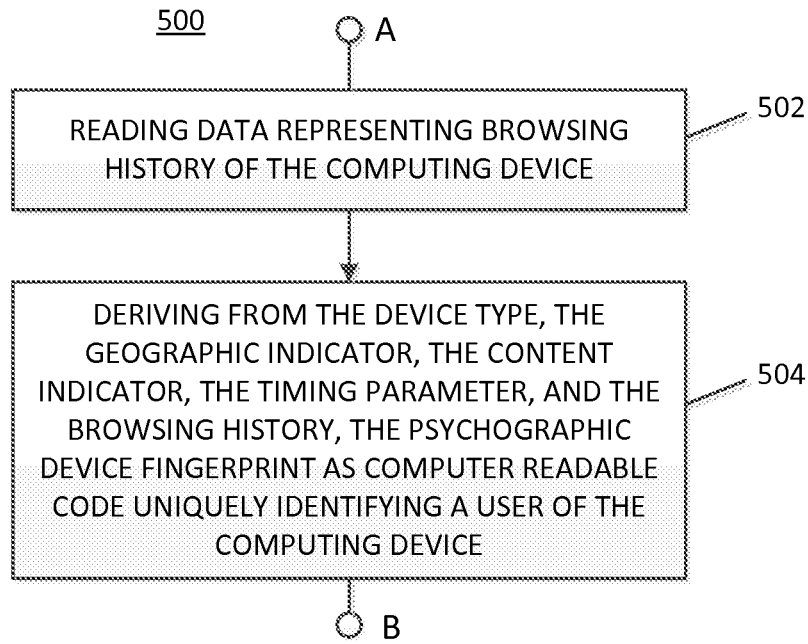
FIG. 5 is a process flow chart illustrating another embodiment of a method according to the invention for psychographic device fingerprinting.

FIG. 5 shows a process flow chart illustrating a method 500 according to the invention for psychographic device fingerprinting. Method 500 is a more elaborate version of method 400, in that, in addition to steps 402-410, it provides a step 502 for reading data representing a browsing history from the computing device of interest. Node A of method 500 indicates that steps 502 and 504 connect to the flow chart at corresponding node A of method 400, as replacement steps for step 412. In process 500, browsing history includes information stored in a web browser the indicates previous resource requests, information stored as cookies in memory on the computing device, and any other data indicative of URLs requested by a user via the computing device, such as plug-ins or other software products known to be downloadable only through specific web addresses. In the final step 504, the PDFG program derives a psychographic device fingerprint from the device type, the geographic indicator, the content indicator, the timing parameter, and the browsing history of the computing device.

Figure 6:
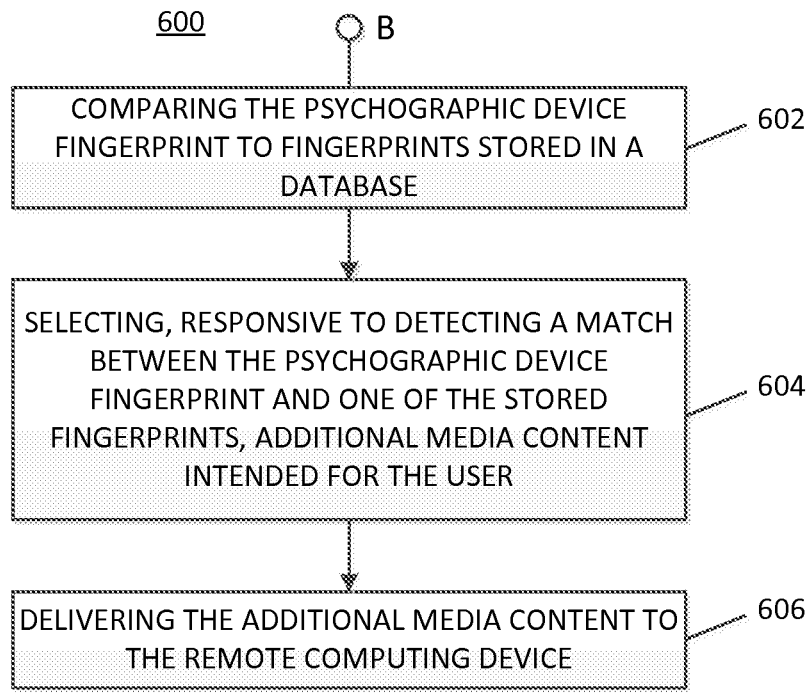
FIG. 6 is a process flow chart illustrating another embodiment of a method according to the invention for psychographic device fingerprinting for selected delivery of media content.

FIG. 6 is a process flow chart illustrating another embodiment of a method 600 according to the invention for psychographic device fingerprinting for selected delivery of media content. Method 600 provides additional process steps, executable by a PDFG program, that may supplement steps of method 400 or 500. The supplemental steps are 602, 604, and 606, which may append either of the previous flow charts at node B, as indicated in the drawings. In step 602, the PDFG program compares the psychographic device fingerprint derived in a previous step (i.e., step 412 or 504) to fingerprints stored in a database, such as in memory 21 of database server 19. In the next step 604, if the program detects a match between the psychographic device fingerprint of the remote computing device and one of the stored fingerprints, it selects additional media content for delivery to the computing device based on knowledge implied by the positive match, that is, knowledge of the identity of the user who is actively operating the computing device. In the final step 606, the PDFG program delivers the additional media content to the remote computing device.

In practice, additional media content targeted for a particular computing device, and delivered in accordance with method 600, may be a web-deliverable advertisement that is likely to appeal to the current user. For example, if a newly derived psychographic device fingerprint matches a signature of the female head of household contained in a psychographic device fingerprint stored in memory, the additional media content may be an advertisement for women's clothing. Or, the additional media may be relevant to the type of device indicated by the psychographic device fingerprint. For example, if the psychographic device fingerprint cross-references to a device type that is a video game platform (e.g. a Nintendo Wii), the additional media content may be an advertisement for the latest video game offered for that platform. Or, the additional media content may be relevant to the geographic region indicated by the psychographic device fingerprint. A restaurant owner, for example, may wish to target an advertisement only to users within a 10-mile radius of her restaurant. Or, the additional media content may be relevant to the type of content indicated by the psychographic device fingerprint. A distributor of Spiderman II may wish to target advertisements for the sequel to users viewing Spiderman I. Skilled artisans will recognize that targeted advertising may exploit many other types and combinations of user traits and preferences indicated by a psychographic device fingerprint.

Figure 7:
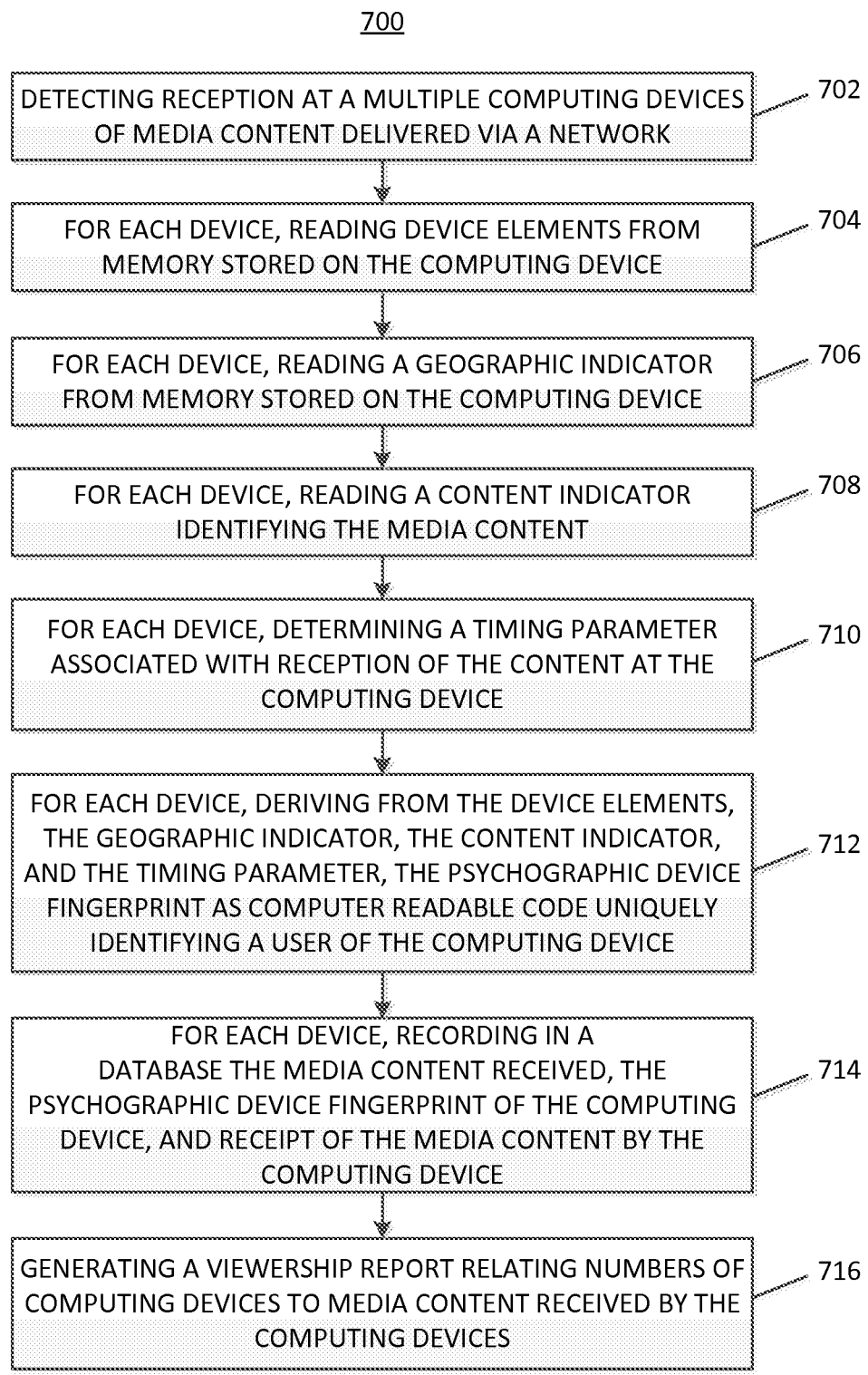
FIG. 7 is a process flow chart illustrating an embodiment of a method for generating a viewership report for web-deliverable media content using psychographic device fingerprinting according to the invention.

FIG. 7 is a process flow chart illustrating an embodiment of a method 700 for generating a viewership report for web-deliverable media content using psychographic device fingerprinting according to the invention. Method 700 may be best understood from the perspective of an application server 13 running a PDFG program 49 while polling or surveying multiple computing devices via network 11.

Method 700 starts at step 702, in which the PDFG program detects reception at multiple computing devices of media content delivered via the network. In one example, the media content may be audio, video or graphics content, or combinations thereof, that comprise entertainment such as an episode of a television series, or a sporting event, or a movie. The detection may occur over any specified period of time. In the next several steps, the program reads data from each of the computing devices, in any order, and at any specified or available time. The data read from the memory of each device by the program includes a number of device elements (step 704), a geographic indicator (step 706), a content indicator (step 708), and a timing parameter (step 710).

In the next step 712, the program derives, for each computing device, from the device elements, the geographic indicator, the content indicator, and the timing parameter, a psychographic device fingerprint as computer readable code. The code uniquely identifies a user, or a group or subgroup of users, of the computing device from which the data was read. In he next step 714, the program records in a database, for each device surveyed, the media content received, the psychographic device fingerprint of each computing device surveyed, and the fact of receipt of the media content by each particular computing device. Finally, in step 716, the program generates a viewership report that relates numbers of computing devices to media content received by the computing devices. The report may be customized, for example, to cover specified time periods, and to cover a specified one or more entertainment programs.

The invention of the psychographic device fingerprint may be applied with varying levels of precision and tolerance. Tolerances may be established independently for each type of data being read by the PDFG program. For example, a content identifier extracted from media may be associated with one of many possible categories. A great number of categories may be defined, limited only by practical boundaries. Some examples of content identifier categories might be sporting events, R-rated movies, cartoons, action movies, music videos, weather reports, news reports, political commentary, concerts, and many others. Tolerances may be established by associating each category with one or more categories according to degrees of separation.

Figure 8:
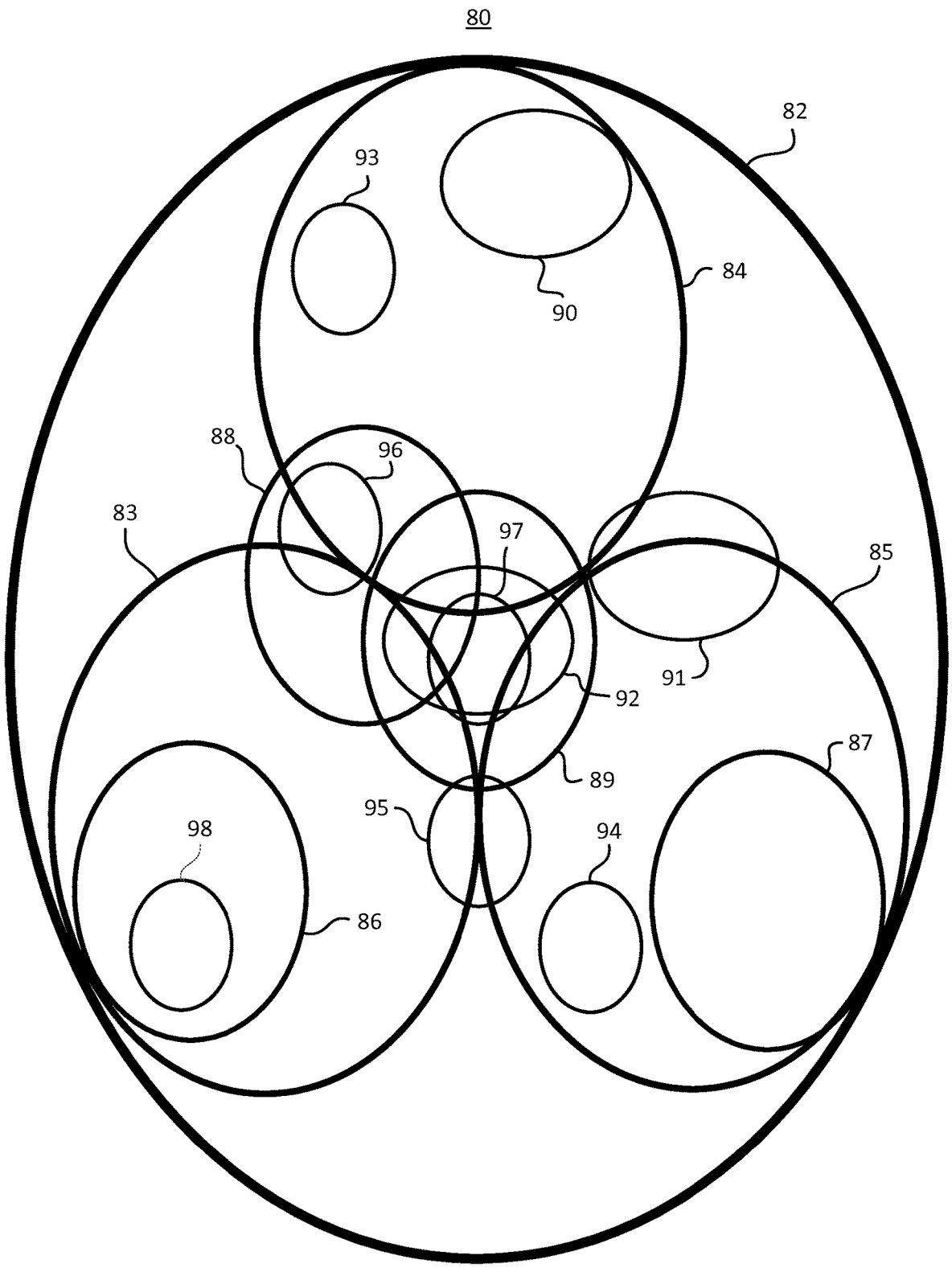
FIG. 8 is a multi-dimensional Venn diagram representing one example of a psychographic device fingerprint according to the invention.
Figure 9:
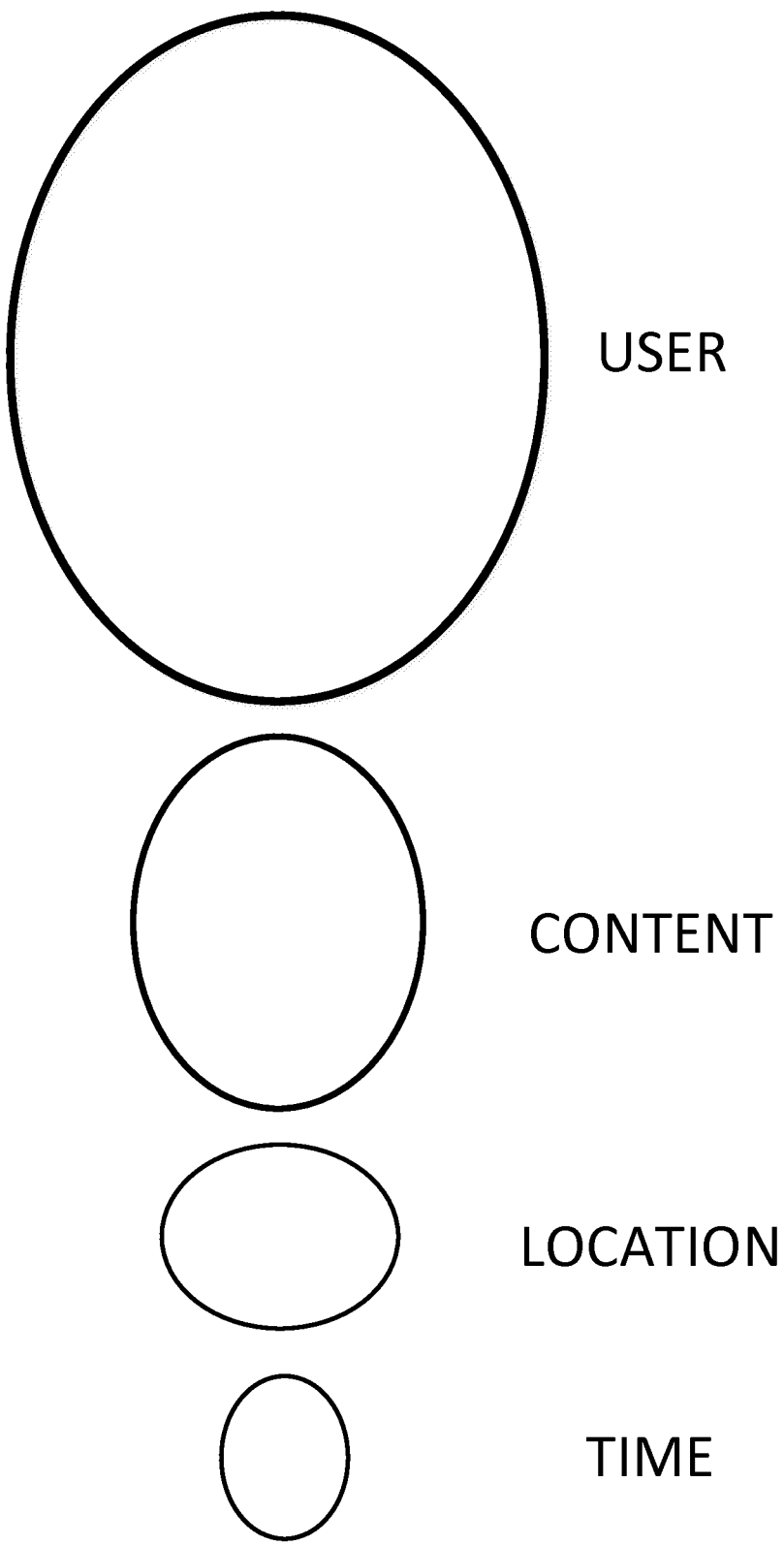
FIG. 9 is a graphical reference key for interpreting multi-dimensional Venn diagrams shown herein

FIG. 8 shows a multi-dimensional Venn diagram for conceptually modeling one example of a psychographic device fingerprint 80 according to the invention. FIG. 9 provides a reference key for interpreting multi-dimensional Venn diagrams shown herein. The key indicates the size and orientation of ovals that represent data types for users, content, location, and time. Each oval represents a category or range of data. Where one size of oval occurs more than one time, this indicates the presence of different categories of a single data type within a psychographic device fingerprint.

The diagram of FIG. 8 consists of multiple ovals superimposed. The largest oval 82 represents the computing device being psychographically fingerprinted. In this example, the particular computing device represented by oval 82 has been identified based on a PDFG program detecting a unique combination of device elements. Within oval 82 there are three large vertical ovals 83, 84, 85, each representing an individual user of the computing device 82. Each user 83, 84, 85 is distinct, and no parts of their ovals intersect. User ovals 83, 84, 85 lying within oval 82 indicates that three users have access to and have previously used the computing device.

User behavioral dimensions are represented by the smaller-sized ovals that represent user-selected content, location and time. The medium size vertical ovals 86, 87, 88, 89 each represent a different category of media content. The smaller size horizontal ovals 90, 91, 92 each represent a different geographic location. The smallest size vertical ovals 93, 94, 95, 96, 97, 98 each represent a timing parameter. For simplicity in this example, each timing parameter may be assumed to represent a different time of day.

The psychographic device fingerprint 80 is a composite diagram that models the usage behavior of all known users simultaneously. The usage behavior may be modeled as such using data collected according to methods of the invention presented above. Of interest when interpreting the diagram is to note which of user ovals 83, 84, 85 are overlapped by a smaller oval (content, location or time). If a smaller oval is completely contained within a user oval, then the behavior represented by the smaller oval is attributable solely to the enveloping user oval. If, however, a smaller oval overlaps two or more user ovals, this indicates that the behavior is attributable to more than one user.

Figure 10:
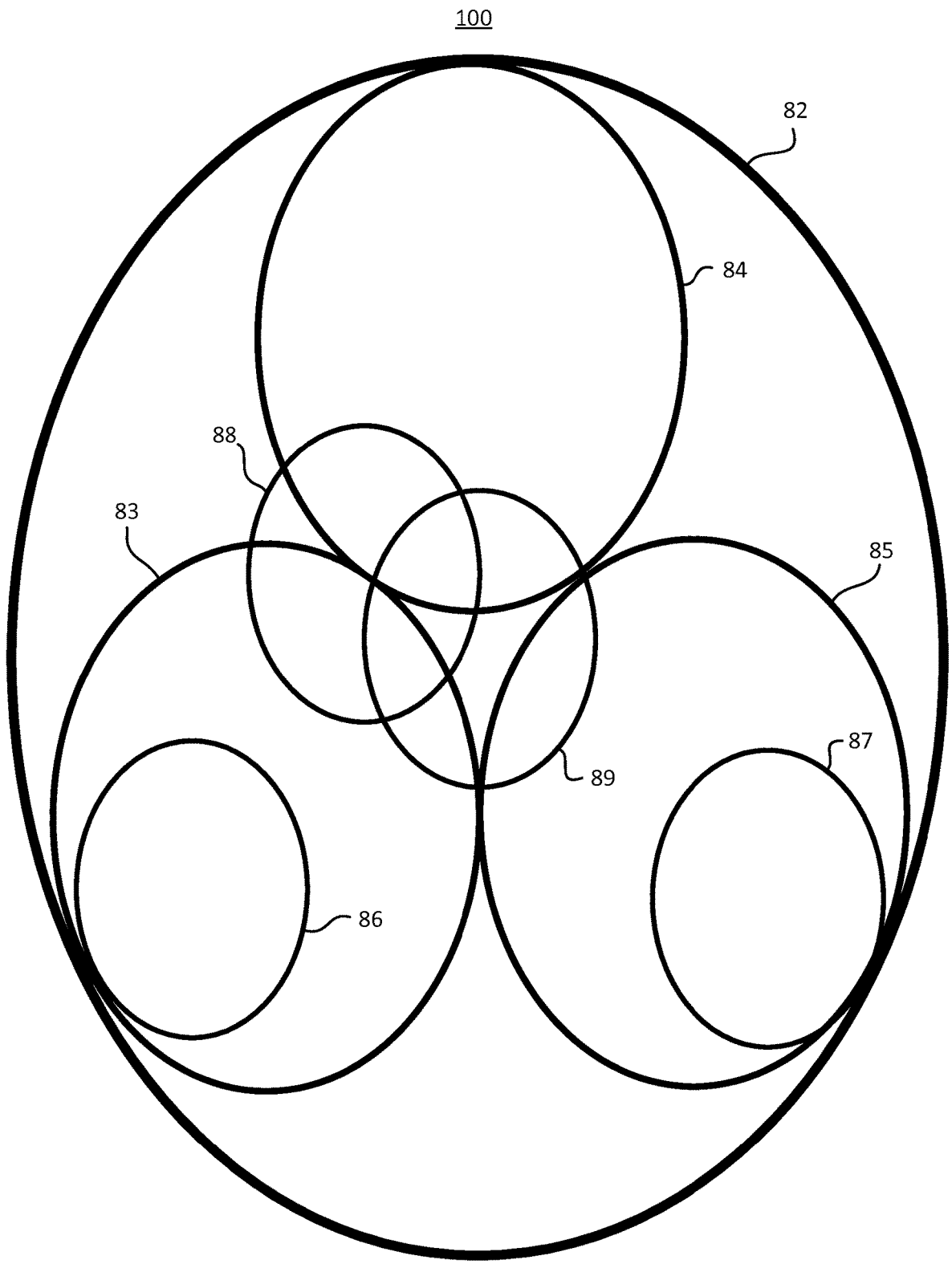
FIG. 10 is a multi-dimensional Venn diagram that represents a partial psychographic device fingerprint relating categories of media content to users of a computing device according to one implementation of the invention.

FIG. 10 shows a multi-dimensional Venn diagram that represents a partial psychographic device fingerprint 100 for device 82. It is a partial fingerprint because it shows only one behavioral dimension, namely, selected content 86, 87, 88, 89, selected among users 83, 84, 85. As indicated in the diagram, content 86 is contained entirely within, and therefore associated only with user 83. In practice, when a PDFG program detects, from a receiving device, elements that cross reference to device 82, and further detects content data that may be categorized (within some reasonable tolerance) as content 86, the program may determine that the user is in fact user 83. As an example, user 83 may be an adult male with a history of viewing golf tournaments, such that content 86 is defined generally as live sporting events. If data returned by the PDFG program includes device element data indicating device 82 and media content data of a category 86, then the PDFG program may positively identify user 83 as the active viewer. Similarly, if the program returns content data of a category 87, the program may identify user 85 as the active viewer.

If, however, the program returns content data of a category 88, which represents a category of media content enjoyed by both user 83 and user 84, another dimension of the psychographic device fingerprint may need to be analyzed before the active viewer may be identified. Similarly, content data detected as category 89, which is common to all three users 83, 84, 85, may likewise be indeterminate and require further analysis of other behavioral dimensions.

Figure 11:
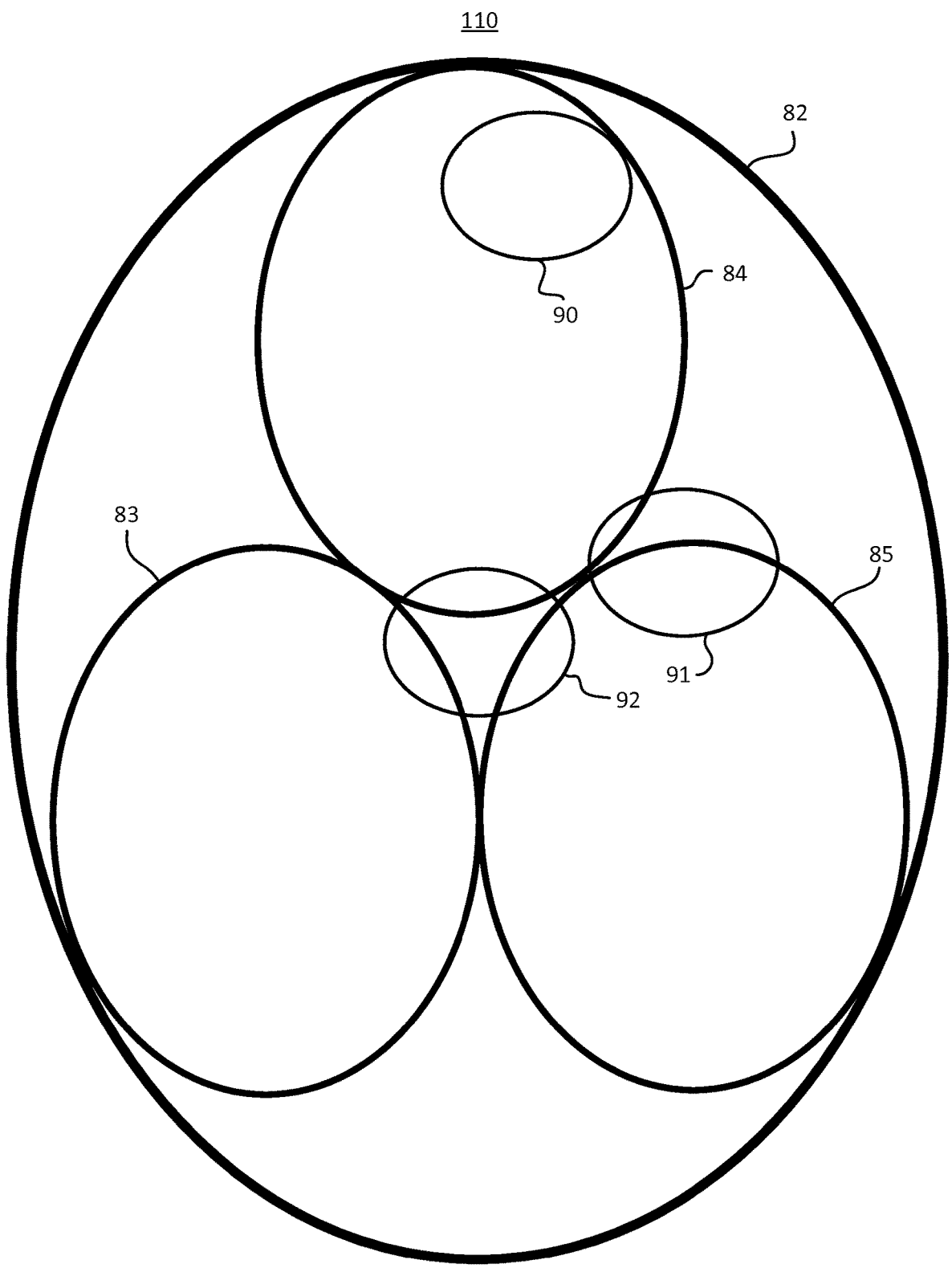
FIG. 11 is a multi-dimensional Venn diagram that represents a partial psychographic device fingerprint relating geographic locations to users of a computing device according to one implementation of the invention.

FIG. 11 shows another multi-dimensional Venn diagram that represents a partial psychographic device fingerprint 110 for device 82. This partial fingerprint shows only the location ovals 90, 91, 92 superimposed on the user ovals 83, 84, 85. Like the content data, location data may be associated with only one user of a device 82, or it may be associated with more than one user. In the example for fingerprint 110, device 82 may be a mobile device or a laptop computer, such that multiple locations may be associated with the device. Location data 90, for example, indicates a site such as a coffee shop where the mobile device or laptop may access the Internet through a wireless local area network. Among users 83, 84, 85, location 90 is associated only with user 84 (e.g. the teenager of the family who frequents the coffee shop). Location 91, however, indicates a site such as a public library network visited by both user 84 and user 85 (e.g., an adult female). The third location, location 92, represents a location that is common to all three users. This location may be their residence, where a router provides network access for the computing device.

In some cases, device element data, content data, and location data may be insufficient for identifying a particular user of a computing device. For example, a partial psychographic device fingerprint that indicates a device 82 viewing a content category 88 at a location 92 presents a dilemma because it would point to both user 83 and user 84. Another behavioral element such as the timing parameter may need to be analyzed to determine the user identity.

Figure 12:
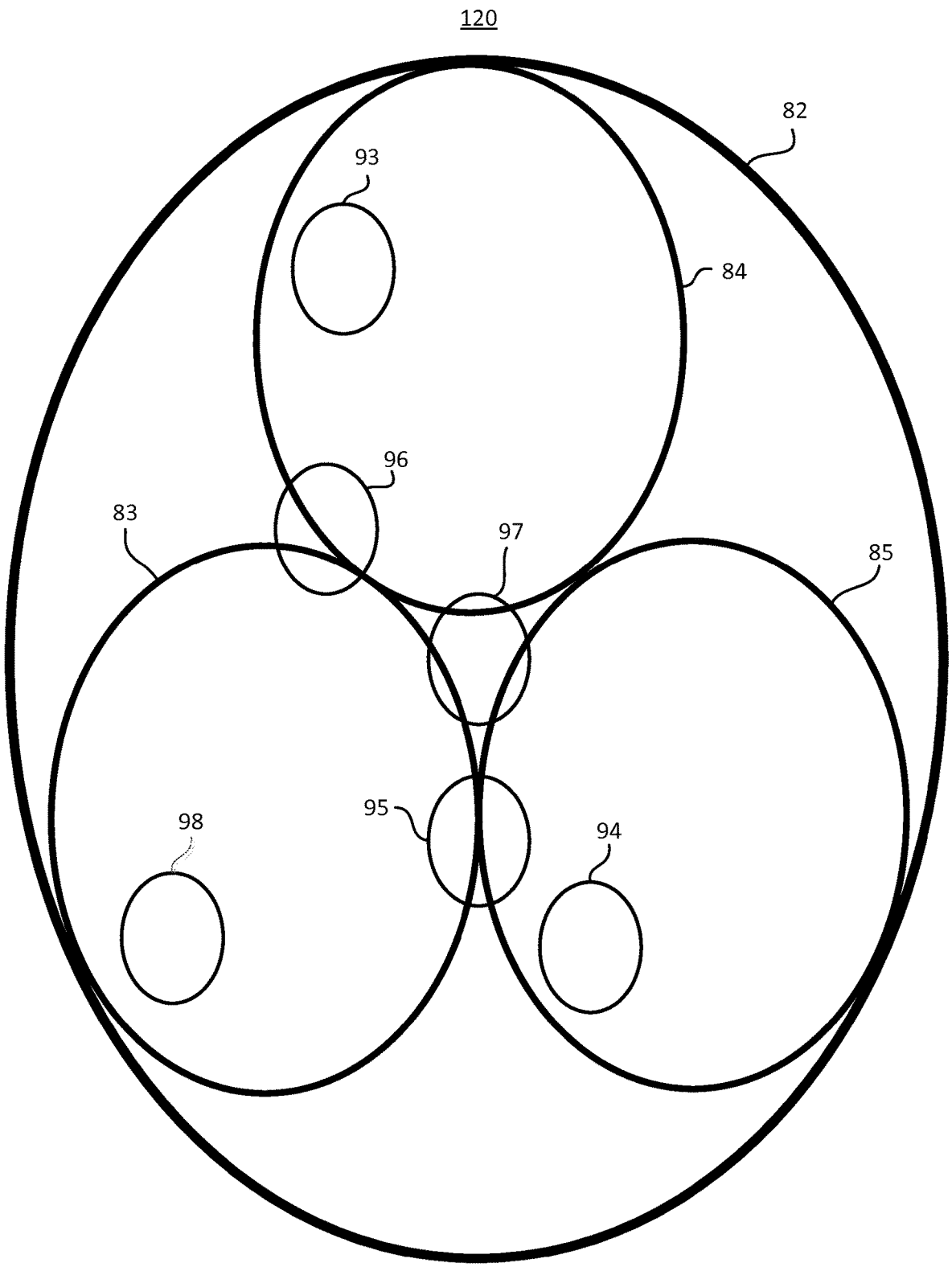
FIG. 12 is a multi-dimensional Venn diagram that represents a partial psychographic device fingerprint relating timing parameters to users of a computing device according to one implementation of the invention.

FIG. 12 shows another multi-dimensional Venn diagram that represents a partial psychographic device fingerprint 120 for device 82. In fingerprint 120, only ovals for timing data are shown superimposed onto the user ovals 83, 84, 85. As with the other behavioral data types, a single timing data oval may be associated with a single user (ovals 93, 94), with two users (ovals 95, 96), or with all three users (oval 97). Other embodiments are contemplated within the scope of the invention where behavioral data may be associated with any number of device users. Returning to the dilemma presented in the previous paragraph, if the psychographic device fingerprint further indicates a timing parameter 95 or 98, then user 83 may be determined to be the active user.

In situations where the psychographic device fingerprint cannot distinguish among multiple possible active users, the invention may resolve viewership as accurately as possible, i.e., by determining a user group or subgroup. In many cases, the inability to resolve viewership down to the individual viewer may realistically indicate that multiple users are simultaneously viewing the media content. For example, the entire family group may be watching a movie on an Apple TV, and the PDFG program may accurately return device 82, content category 89, location 92, and timing parameter 97. In this case, the psychographic device fingerprint has identified an active viewing group that meets the criteria for a more broadly targeted advertising campaign.

In addition, the invention allows the psychographic device fingerprint to be updated as new data is returned by the PDFG program. Where a partial fingerprint is sufficient to identify an individual user, newly identified behavioral data may be associated with the user and stored for future reference. For example, a PDFG program may return device 82, timing 93, and a media content X previously not associated with any user of device 82. In this case, the program may identify the user as user 83 based on the device and timing parameter, then update the fingerprint database to associate media content X with user 83. In one embodiment, PDFG program associates updates behavioral data for a particular user only after a predetermined number of occurrences of the behavior.

Figure 13:
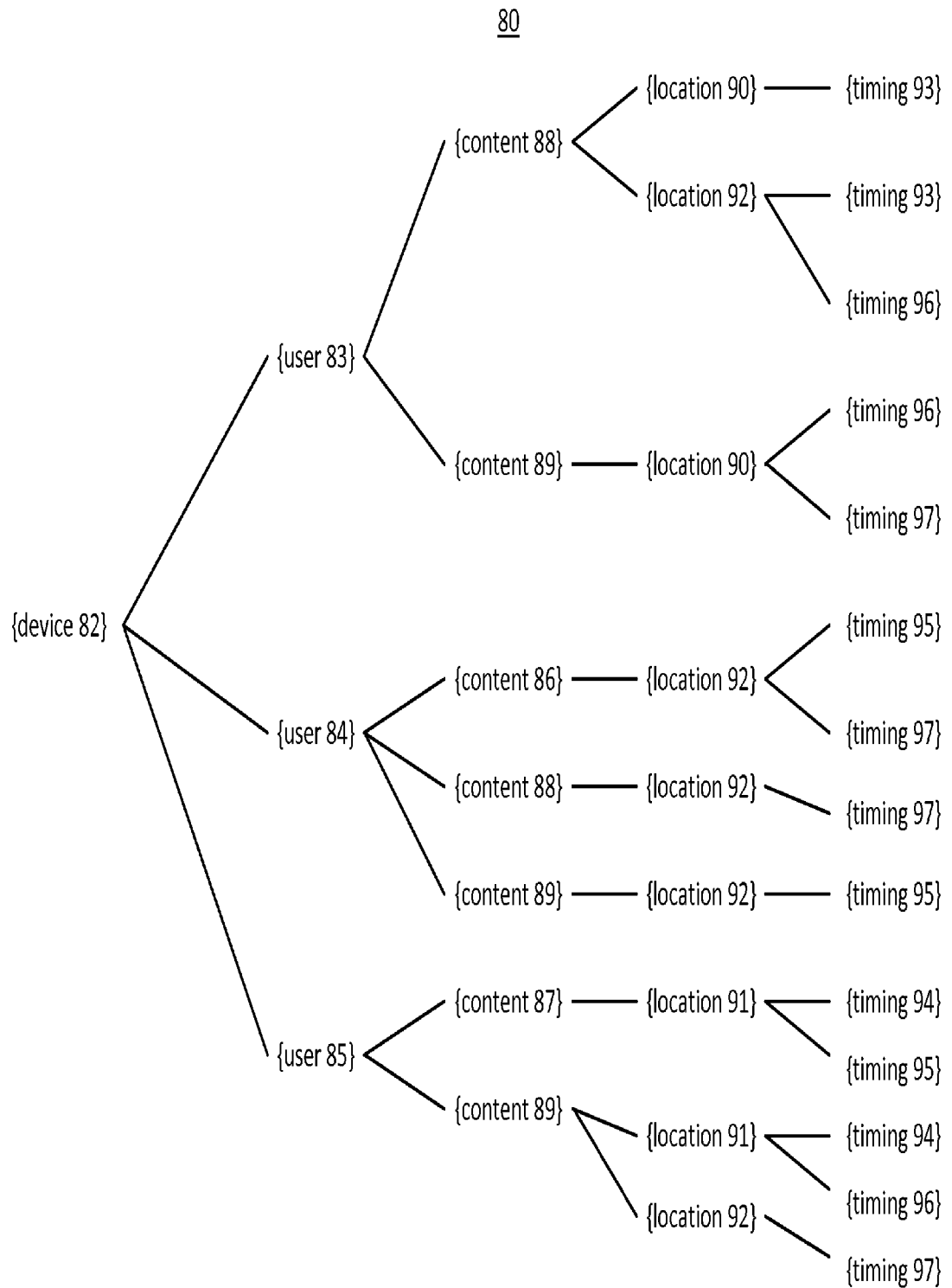
FIG. 13 is a relational data tree representing another example of a psychographic device fingerprint according to the invention, relating behavioral data to users of an identified computing device.

FIG. 13 shows a relational data tree that provides an alternative conceptual model for the psychographic device fingerprint 80 derived according to the invention. The entries in the data tree correspond to the data ovals presented in FIG. 8. Each entry is shown surrounded in brackets. Each entry represents computer readable data, such as a binary value stored in memory, such as memory 21 accessible by database server 19. The lines connecting the entries represent an association between connected entries. In one embodiment, the associations between data entries comprise an integral part of the psychographic device fingerprint. In one example, the associations may comprise database pointers in a database.

The relational data tree depicts a psychographic device fingerprint 80 stored in memory and available for reference. When surveying a network for devices viewing or having downloaded media content, a PDFG program according to the invention may derive a new psychographic device fingerprint from a remote computing device, and the newly derived fingerprint may be compared to a library of fingerprints stored in memory. When a comparison of the device element portion of the fingerprint positively identifies a particular computing device, which in this example is device 82, then the program may compare the behavioral data portion of the newly derived fingerprint to the data structure stored in memory and represented by the relational data tree.

In one embodiment, the newly derived psychographic device fingerprint may include an encoded portion that represents the behavioral data of content, location and timing. This combination is compared to all possible combinations of content, location, and timing that are recorded in the stored fingerprint 80. If a match is found, the PDFG program may positively identify a particular user as the active user. For example, for device 82, a newly derived fingerprint includes behavioral data representing a combination of content 88, location 92, and timing 96. This combination exists only for user 83, therefore user 83 is determined to be the active user of device 82. In another example, a newly derived fingerprint returns behavioral data for content 89, location 92, and timing 97, which uniquely identifies user 85 as the active user.

Figure 14:
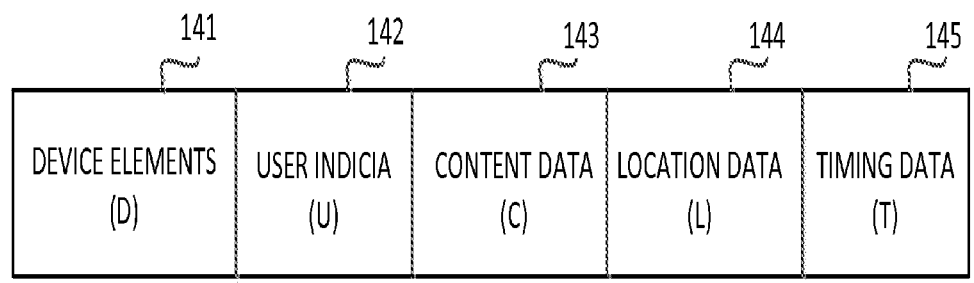
FIG. 14 is a block diagram representation of one embodiment of a psychographic device fingerprint, showing multiple data segments composing a bit string derived in accordance with the present invention.

FIG. 14 shows a block diagram representation of one embodiment of a psychographic device fingerprint 140 derived in accordance with the invention. Fingerprint 140 may be a bit stream or character string that comprises distinct segments of data, as shown. Each data segment represents a data type of the psychographic device fingerprint. A psychographic device fingerprint may include all of these types of data, or one or more data types may be missing, or temporarily undefined until updated at a later time. Multiple instances of a single data type may exist in any such fingerprint. In fingerprint 140, block 141 includes device element data, block 142 includes user indicia, block 143 includes content data, block 144 includes location data, and block 145 includes timing data. The bit stream may undergo any of various digital processes, such as hashing, encoding, encryption, and compression, to facilitate security, transmission, storage, etc.

Examples of partial character strings that conform to the basic data structure of the psychographic device fingerprint 140 are now provided. They are partial character strings because, for simplicity, certain data is omitted, such as data comprising headers and nonces that may be required to conform to selected transmission or security protocols. In the exemplary strings, each character may represent a plurality of bits.

In the first example, a psychographic device fingerprint comprises the string D1U1C1L1T1. Here, segment D1 represents device elements for a first computing device; segment U1 represents a first user of D1; segment C1 represents first content data detected at D1; segment L1 represents first location data associated with D1 and C1; and segment T1 represents first timing data associated with D1, C1, and L1. For device D1, a single user U1 receives content C1 at a location L1 at time T1. In this example, the string D1U1C1L1T1 comprises a single signature of a psychographic device fingerprint. A signature is defined as character string having no more than one segment of each data type. A signature may be considered as a single viewing event, for example, the laptop computer being used by the father to view a sports video at a particular coffee shop between 8 PM and 9 PM.

In the second example, a psychographic device fingerprint comprises multiple signatures, representing multiple events that involve multiple users of a single device. The fingerprint has evolved over time as new signatures have been derived from the device and merged into the psychographic device fingerprint on file. With reference to FIG. 13, a psychographic device fingerprint for device 82 having users 83, 84, 85 who viewed content categories 86, 87, 88, 89 at general locations 90, 91, 92 within time ranges 93, 94, 95, 96, 97 consists of the string D82U83C88L90T93L92T93T96C89L90T96T97U84C86L92T95T97-C88L92T97C89L92T95U85C87L91T94T95C89L91T94T96L92T97.

In the above examples, the associations between data types are coded according to a hierarchical order of appearance in the character string. The order, as demonstrated by the single specimen defined in the first exemplary string, is: device, user, content, location, and timing. By inspecting the character string in the second example, the first specimen D82U83C88L90T93 can be read from device D82 to the first occurrence of timing data segment T93. The next data segment L92 may then be read, and the second specimen derived by repeating data types of higher order than L92 and reading additional data segments following L92 until the next timing segment is found. This results in the second signature D82U83C88L92T93. This process may be repeated until all possible signatures within a psychographic device fingerprint are derived, and the signatures so derived may then be used during a comparing step when evaluating a newly derived fingerprint for a match.

The preceding paragraph provides one example of a manner in which associations between data segments may be coded within a psychographic device fingerprint. Skilled programmers will recognize that many other coding techniques are possible that will achieve the same objective of encoding information within a character string to preserve associations between data segments. In addition, other hierarchical orders, or non-hierarchical orders, may be applied among the data types to preserve associations without departing from the scope of the invention.

Many advantages may be realized through application of a PDFG program in a network environment such as the Internet. Psychographic device fingerprinting according to the invention provides an operator of the database server with the ability to determine, on a wide scale and for a particular web-delivered media content: how many devices viewed the content, what type of devices viewed the content, who viewed the content, where the content was viewed, and when the content was viewed. Producers, advertisers, device makers, and other researchers may benefit from such intelligence. For example, the application server 13 may be configured to query database server 19 to generate a viewership report that relates numbers of computing devices to media content received by those devices. In a marketing application, the system may generate a report that identifies a population of psychographic device fingerprints that exhibits a common or similar signature, and additional media content, such as an advertisement, may be targeted for that audience. For example, a distributor of a new video game may only wish to advertise to a selected population of devices of the type that has a platform capable of running the game. A manufacturer of a smart phone may need to know whether consumers are using its product to view content that it was not designed to display. An advertiser of consumer goods, tasked with selecting the most appropriate content to sponsor, may need to know which type of media content is viewed at a residence, versus which type is viewed on a mobile device. Skilled artisans will appreciate that many viewership or usage reports may be extracted from the database of psychographic device fingerprints and tailored for these purposes.

Other embodiments within the scope of the invention include application of a PDFG program to a system wherein the computing device being psychographically fingerprinted comprises a remote central server serving multiple users of sub-devices that are functionally linked to the remote central server through a security scheme that serves a limited pool of users. In such a system, where device elements of the sub-devices may be wholly or partially invisible to the PDFG program, a psychographic device fingerprint may be derived for the pool of users and represent the aggregate behavior of the users as reflected in the actions of the remote central server.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatically updating a database of psychographic device fingerprints, comprising:
   a computing device in data communication with a network; and
   memory accessible by the computing device and storing a psychographic device fingerprint generating program configured to automatically update an existing psychographic device fingerprint stored in the database which, when executed, performs steps for:
   (a) detecting reception at the computing device of media content delivered via the network;
   (b) reading one or more device elements from the memory;
   (c) reading a geographic indicator from the memory;
   (d) determining a timing parameter associated with reception of the media content at the computing device;
   (e) reading a content indicator identifying the media content;
   (f) deriving from the one or more device elements, the geographic indicator, the timing parameter, and the content indicator, a bit stream comprising a psychographic device fingerprint, the bit stream uniquely identifying the computing device and one or more users of the computing device;
   (g) comparing the psychographic device fingerprint to fingerprints stored in the database;
   (h) detecting a partial match between the psychographic device fingerprint and one of the stored fingerprints, wherein the partial match comprises a part of the bit stream of the psychographic device fingerprint; and
   (i) updating the one stored fingerprint that was partially matched by replacing it in the database with the psychographic device fingerprint.

2. The system of claim 1, wherein the partial match comprises the content indicator.

3. The system of claim 1, wherein the partial match comprises the timing parameter.

4. The system of claim 1, wherein the partial match comprises the geographic indicator.

5. The system of claim 1, wherein the bit stream is coded according to a hierarchical order.

6. The system of claim 5, wherein the partial match requires at least a match of device data coded according to the hierarchical order in the bit stream.

7. The system of claim 5, wherein the partial match requires at least a match of user data coded according to the hierarchical order in the bit stream.

8. The system of claim 5, wherein the partial match requires at least a match of geographic data coded according to the hierarchical order in the bit stream.

9. The system of claim 1, wherein the program, when executed, performs an additional step for:
   (j) selecting, based on the updated fingerprint, additional media content for the one or more users.

10. The system of claim 9, wherein the program, when executed, performs an additional step for:
    (k) delivering the additional media content to the computing device.

11. The system of claim 1, wherein the media content comprises streaming video.

12. The system of claim 1, wherein the program, when executed, identifies a device type from the device elements.

13. The system of claim 1, wherein the computing device is a server.

14. The system of claim 1, wherein the computing device is a client computing device.

15. The system of claim 14, wherein the psychographic device fingerprint generating program is stored in a browser memory.

16. The system of claim 1, wherein the content indicator comprises URL header information.

17. The system of claim 1, wherein the content indicator comprises a program title.

18. The system of claim 1, wherein the program, when executed by the server, repeats steps (f)-(h) until the partial match of step (h) has been detected a predetermined number of times.

19. The system of claim 18, wherein the updating step comprises updating the one stored fingerprint only if the partial match is detected the predetermined number of times.

* * * * *